US012776116B2

(12) United States Patent
Zhou

(10) Patent No.: US 12,776,116 B2
(45) Date of Patent: Oct. 27, 2026

(54) OBSTACLE DETECTION METHOD AND APPARATUS, DEVICE, AND MEDIUM

(71) Applicant: Yinwang Intelligent Technologies Co., Ltd., Shenzhen (CN)

(72) Inventor: Wei Zhou, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 477 days.

(21) Appl. No.: 17/716,837

(22) Filed: Apr. 8, 2022

(65) Prior Publication Data

US 2022/0230448 A1 Jul. 21, 2022

Related U.S. Application Data

(63) Continuation of application No. PCT/CN2020/100051, filed on Jul. 3, 2020.

(30) Foreign Application Priority Data

Oct. 9, 2019 (CN) ........................ 201910954529.X

(51) Int. Cl.
*G06V 10/14* (2022.01)
*G06V 10/50* (2022.01)
(Continued)

(52) U.S. Cl.
CPC .............. *G06V 10/14* (2022.01); *G06V 10/50* (2022.01); *G06V 10/58* (2022.01); *G06V 10/60* (2022.01);
(Continued)

(58) Field of Classification Search
None
See application file for complete search history.

(56) References Cited

U.S. PATENT DOCUMENTS

2007/0003165 A1 1/2007 Sibiryakov et al.
2018/0260649 A1* 9/2018 Kadambe ............... H04N 5/919

FOREIGN PATENT DOCUMENTS

CN 102609963 A 7/2012
CN 108108721 A 6/2018
(Continued)

OTHER PUBLICATIONS

Xu et al., "Multisource Remove Sensing Data Classification Based on Convolutional Neural Network," IEEE Transactions on Geoscience and Remote Sensing, vol. 56, No. 2, pp. 937-949 (Year: 2018).*
(Continued)

*Primary Examiner* — Vincent Rudolph
(74) *Attorney, Agent, or Firm* — WOMBLE BOND DICKINSON (US) LLP

(57) ABSTRACT

This application discloses an obstacle detection method, including: obtaining a first image, where the first image is an image encoded based on an RGB model; reconstructing the first image to obtain a second image, where the second image is a hyper spectral image; and extracting a hyper spectral feature from the hyper spectral image, and classifying a candidate object in the hyper spectral image based on the hyper spectral feature to obtain an obstacle detection result. Because different textures correspond to different hyper spectral features, classifying candidate objects in hyper spectral images based on the hyper spectral features can distinguish an object that has a similar color but a different texture.

10 Claims, 6 Drawing Sheets

(51) Int. Cl.

| | |
|---|---|
| ***G06V 10/58*** | (2022.01) |
| ***G06V 10/60*** | (2022.01) |
| ***G06V 10/778*** | (2022.01) |
| ***G06V 10/80*** | (2022.01) |
| ***G06V 10/82*** | (2022.01) |
| ***G06V 20/58*** | (2022.01) |
| *B60W 30/095* | (2012.01) |

(52) U.S. Cl.

CPC .......... *G06V 10/778* (2022.01); *G06V 10/806* (2022.01); *G06V 10/82* (2022.01); *G06V 20/58* (2022.01); *B60W 30/095* (2013.01)

(56) References Cited

FOREIGN PATENT DOCUMENTS

| | | | | |
|---|---|---|---|---|
| CN | 110009032 A | | 7/2019 | |
| CN | 110188606 A | * | 8/2019 | ......... G06K 9/00798 |

OTHER PUBLICATIONS

Yu Lifu, "Research on Hyperspectral Image Spectral Spatial Classification Based on Deep Autoencoder Network", Xidian University, Apr. 2018, with an English abstract, total 76 pages.
Boaz Arad et al., "Sparse Recovery of Hyperspectral Signal from Natural RGB Images", ECCV 2016, Part VII, LNCS 9911, pp. 19-34, 2016, total 16 pages.
Huiqun Li et al.,"HSVCNN: CNN-Based Hyperspectral Reconstruction From RGB Videos",2018 IEEE, total 5 pages.
Rubeena et al.,"Multisensor Multiresolution Data Fusion for Improvement in Classification",2016 SPIE, doi: 10.1117/12.2222164, total 12 pages.
Sriharsha Koundinya et al,"2D-3D CNN based architectures for spectral reconstruction from RGB images",2018 IEEE/CVF Conference on Computer Vision and Pattern Recognition Workshops, Jun. 18, 2018 (Jun. 18, 2018),8 pp. 957-9577,XP033475422.

* cited by examiner

OBSTACLE DETECTION METHOD AND APPARATUS, DEVICE, AND MEDIUM

CROSS-REFERENCE TO RELATED APPLICATIONS

This application is a continuation of International Application No. PCT/CN2020/100051, filed on Jul. 3, 2020, which claims priority to Chinese Patent Application No. 201910954529.X, filed on Oct. 9, 2019. The disclosures of the aforementioned applications are hereby incorporated by reference in their entireties.

TECHNICAL FIELD

This application relates to the communication field, and in particular, to an obstacle detection method and apparatus, a device, a medium, and a computer program product.

BACKGROUND

With rapid development of artificial intelligence, assisted driving and autonomous driving technologies emerge. When assisted driving or autonomous driving is enabled, a surrounding driving environment needs to be sensed, that is, information such as a pedestrian, a vehicle, a lane line, a drivable area, and an obstacle on a driving path needs to be sensed, so as to avoid a collision with another vehicle, a pedestrian, and an obstacle, or avoid deviation from a lane line, and the like.

For obstacle sensing, the industry provides a binocular camera-based obstacle detection method. A binocular camera can implement parallax detection on an image, so that a parallax condition of an obstacle can be obtained, and obstacle detection can be implemented based on the parallax condition.

However, a binocular camera has problems such as a high baseline requirement and a high calibration requirement. When a color of an obstacle is similar to that of an environment, missed detection may be caused. Consequently, a binocular camera-based detection system fails to detect the obstacle, and some safety hazards are caused to driving.

SUMMARY

In view of this, this application provides an obstacle detection method. In the method, an image encoded based on an RGB model is reconstructed into a hyper spectral image, and an obstacle can be detected based on a texture and the hyper spectral image. This resolves a problem of missed detection caused by a color similarity between an obstacle and an environment. In some embodiments, a cost is low and feasibility is high.

According to a first aspect of the embodiments of this application, an obstacle detection method is provided. The method includes:

obtaining a first image, where the first image is an image encoded based on an RGB model;

reconstructing the first image to obtain a second image, where the second image is a hyper spectral image; and/or extracting a hyper spectral feature from the hyper spectral image, and/or classifying a candidate object in the hyper spectral image based on the hyper spectral feature to obtain an obstacle detection result.

In some embodiments, the reconstructing the first image to obtain a second image includes:

extracting a spatial feature of the first image; and/or performing image reconstruction based on the spatial feature of the first image by using a correspondence between the spatial feature and a spectral feature to obtain the second image.

In some embodiments, the method includes:

obtaining a data dictionary from a configuration file, where the data dictionary includes a correspondence between a spatial feature and a spectral feature; or obtaining sample data, and/or performing machine learning by using the sample data to obtain a correspondence between a spatial feature and a spectral feature.

In some embodiments, the method includes:

fusing the hyper spectral feature and the spatial feature of the first image to obtain a fused feature; and/or the classifying a candidate object in the hyper spectral image based on the hyper spectral feature includes:

classifying the candidate object in the hyper spectral image based on the fused feature.

In some embodiments, the hyper spectral feature and the spatial feature of the first image are fused by using a Bayesian data fusion algorithm.

In some embodiments, the first image includes an RGB image, an RCCC image, an RCCB image, or an RGGB image.

In some embodiments, the obstacle detection result includes a location and a texture of the obstacle; and/or the method includes:

determining a drivable area based on the location and the texture of the obstacle; and sending the drivable area to a controller of a vehicle to indicate the vehicle to travel based on the drivable area.

According to a second aspect of the embodiments of this application, an obstacle detection apparatus is provided. The apparatus includes:

an obtaining module, configured to obtain a first image, where the first image is an image encoded based on an RGB model;

a reconstruction module, configured to reconstruct the first image to obtain a second image, where the second image is a hyper spectral image; and/or a detection module, configured to: extract a hyper spectral feature from the hyper spectral image, and/or classify a candidate object in the hyper spectral image based on the hyper spectral feature to obtain an obstacle detection result.

In some embodiments, the reconstruction module is specifically configured to:

extract a spatial feature of the first image; and/or perform image reconstruction based on the spatial feature of the first image by using a correspondence between the spatial feature and a spectral feature to obtain the second image.

In some embodiments, the obtaining module is configured to:

obtain a data dictionary from a configuration file, where the data dictionary includes a correspondence between a spatial feature and a spectral feature; or obtain sample data, and/or perform machine learning by using the sample data to obtain a correspondence between a spatial feature and a spectral feature.

In some embodiments, the apparatus includes:

a fusion module, configured to fuse the hyper spectral feature and the spatial feature of the first image to obtain a fused feature; and/or the detection module is specifically configured to:

classify the candidate object in the hyper spectral image based on the fused feature.

In some embodiments, the fusion module is specifically configured to:

fuse the hyper spectral feature and the spatial feature of the first image by using a Bayesian data fusion algorithm.

In some embodiments, the first image includes an RGB image, an RCCC image, an RCCB image, or an RGGB image.

In some embodiments, the obstacle detection result includes a location and a texture of the obstacle; and/or the apparatus includes:

a determining module, configured to determine a drivable area based on the location and the texture of the obstacle; and/or a sending module, configured to send the drivable area to a controller of a vehicle to indicate the vehicle to travel based on the drivable area.

According to a third aspect of the embodiments of this application, a driver assistant system is provided, including a processor and a memory, where:

the memory is configured to store a computer program; and the processor is configured to perform the obstacle detection method according to the first aspect based on instructions in the computer program.

According to a fourth aspect of the embodiments of this application, a vehicle is provided. The vehicle includes the driver assistant system according to the third aspect and a controller, where the controller is configured to control, based on an obstacle detection result output by the driver assistant system, the vehicle to travel.

According to a fifth aspect of the embodiments of this application, a computer-readable storage medium is provided. The computer-readable storage medium is configured to store program code, and the program code is used to perform the obstacle detection method according to the first aspect of this application.

According to a sixth aspect of the embodiments of this application, a computer program product including computer-readable instructions is provided. When the computer-readable instructions are run on a computer, the computer is enabled to perform the obstacle detection method in the foregoing aspects.

According to the foregoing technical solutions, it can be learned that embodiments of this application have the following advantages:

The embodiments of this application provide the obstacle detection method. In the method, the first image encoded based on the RGB model is reconstructed to obtain the hyper spectral image, and/or the hyper spectral feature is extracted from the hyper spectral image. Because different textures correspond to different hyper spectral features, classifying candidate objects in hyper spectral images based on the hyper spectral features can distinguish an object that has a similar color but a different texture. On this basis, an obstacle that has a color same as or similar to that of an environment can be detected, thereby reducing a detection miss rate. In some embodiments, in the method, a common camera may be used to obtain hyper spectral images in a manner of image reconstruction, without using an imaging spectrometer. Therefore, a cost is low and feasibility is high.

BRIEF DESCRIPTION OF DRAWINGS

To describe the technical solutions in embodiments of this application or in the conventional technology more clearly, the following briefly describes the accompanying drawings for describing embodiments or the conventional technology. It is clear that the accompanying drawings in the following description show some embodiments of this application, and persons of ordinary skill in the art may still derive other drawings from these accompanying drawings without creative efforts.

DESCRIPTION OF EMBODIMENTS

Figure 1:
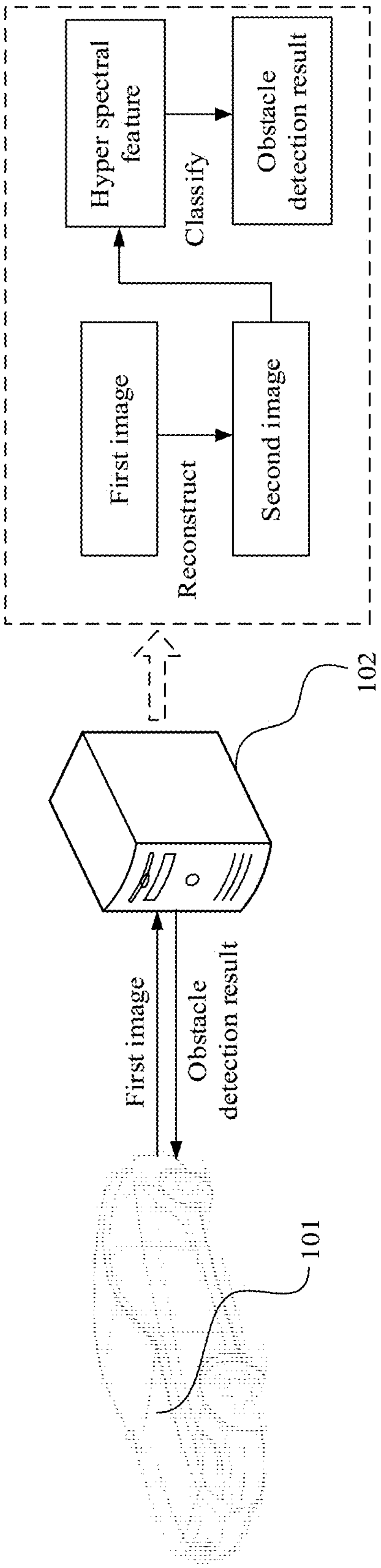
FIG. 1 is a diagram of a system architecture for an obstacle detection method according to an embodiment of this application.

Embodiments of this application provide an obstacle detection method, to resolve problems such as a high baseline requirement and a high calibration requirement of a binocular camera used for obstacle detection, and a missed detection problem caused by a similarity between an obstacle color and an environment color without an additional cost.

To make persons skilled in the art understand the technical solutions in this application better, the following clearly describes the technical solutions in embodiments of this application with reference to the accompanying drawings in embodiments of this application. It is clear that the described embodiments are merely some rather than all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in orders except the order illustrated or described herein. In some embodiments, the terms "include", "contain" and any other variants mean to cover the non-exclusive inclusion. For example, a process, method, system, product, or device that includes a list of operations or units is not necessarily limited to those operations or units, but may include other operations or units not expressly listed or inherent to such a process, method, product, or device.

It can be understood that, the obstacle detection method provided in the embodiments of this application may be applied to a scenario such as autonomous driving (AD) or assisted driving. In an example of the assisted driving scenario, the method may be applied to an advanced driver assistant system (ADAS). The ADAS can implement obstacle detection (OD), road profile detection (Road Profile Detection, RPD), traffic sign reorganization (TSR), and further provide services such as intelligent speed limit information (ISLI). In this way, a driving safety hazard caused by human negligence can be avoided through automatic detection, thereby improving driving safety. In some embodiments, as driver operations are greatly reduced, driving experience can be improved.

In actual application, the foregoing obstacle detection method may be applied to any processing device having an image processing capability. The processing device may be a terminal that has a central processing unit (CPU) and/or a graphics processing unit Graphics Processing Unit, or a server that has a CPU and/or a GPU. The terminal may be a personal computing device (PC), a workstation, or the like. The terminal or the server implements the obstacle detection method by communicating with a driver assistant system or the like of a vehicle. Certainly, in some cases, the terminal may alternatively be an in-vehicle terminal, for example, a driver assistant system built in a vehicle. The driver assistant system may also independently implement the obstacle detection method.

The obstacle detection method provided in the embodiments of this application may be stored in a processing device in a form of a computer program. The processing device implements the obstacle detection method provided in the embodiments of this application by running the computer program. The computer program may be independent, or may be a functional module, a plug-in, an applet, or the like integrated on another computer program.

The following describes in detail an application environment of the obstacle detection method provided in the embodiments of this application. The method may be applied to an application environment including but not limited to an application environment shown in FIG. 1.

As shown in FIG. 1, a driver assistant system 101 is deployed in a vehicle. The driver assistant system 101 can invoke a front view camera of the vehicle to photograph an ambient environment of the vehicle to obtain a first image, or may obtain the first image by using a test camera, a rear view camera, or a surround view camera. The first image is specifically an image encoded based on an RGB model. Then, the driver assistant system 101 may transmit the first image to a server 102 over a network, for example, a wireless communication network such as a 4G or 5G wireless communication network. The server 102 reconstructs the first image to obtain a second image. The second image is specifically a hyper spectral image. Subsequently, the server 102 extracts a hyper spectral feature from the hyper spectral image, and classifies a candidate object in the hyper spectral image based on the hyper spectral feature to obtain an obstacle detection result.

To make the technical solutions of this application clearer and easier to understand, the following describes in detail the obstacle detection method provided in the embodiments of this application from a perspective of a server with reference to the accompanying drawings.

Figure 2:
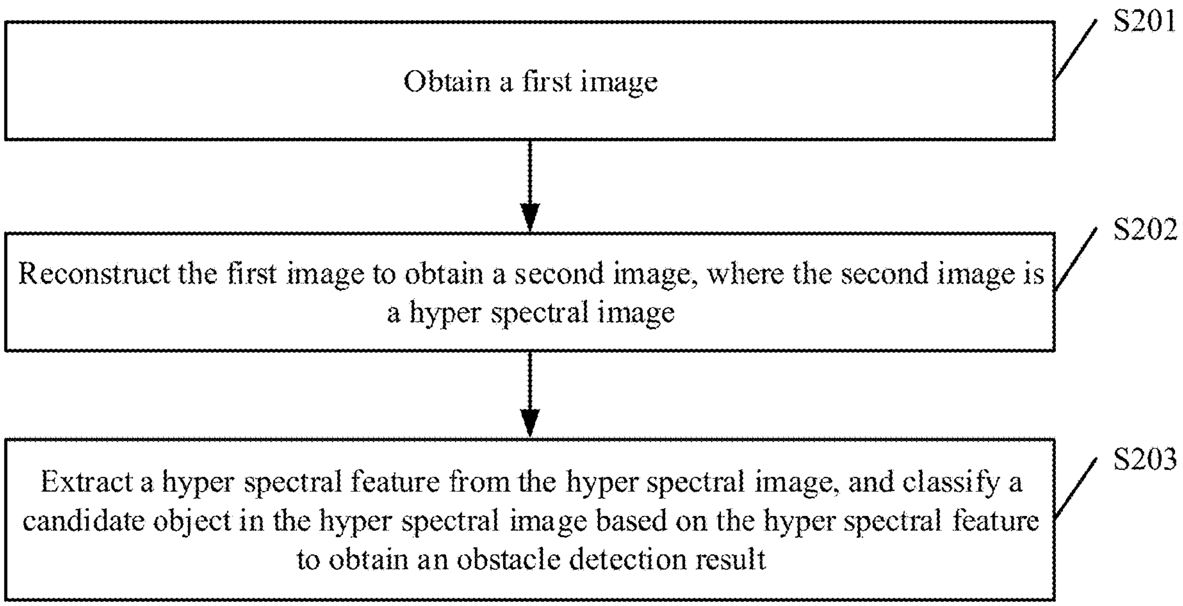
FIG. 2 is a flowchart of an obstacle detection method according to an embodiment of this application.

Referring to a flowchart of an obstacle detection method shown in FIG. 2, the method includes the following operations.

S201. Obtain a first image.

The first image is an image encoded based on an RGB model. The RGB model is also referred to as an RGB color model or a red-green-blue color model. It is an additive color model in which red, green, and blue primary colors of light are added together at different ratios to generate light of various colors.

In actual application, the foregoing image encoded based on the RGB model may be an image obtained by filtering by using a general color filter array (CFA), that is, an RGB image, or an image obtained by filtering by using another filter. This may be specifically determined based on an actual requirement.

For example, a CFA of a Bayer filter is provided with one red light filter, one blue light filter, and two green light filters (that is, 25% red, 25% blue, and 50% green). Human eyes are naturally more sensitive to green, and permeability of green light is higher than that of the other two colors in the Bayer filter. Therefore, an image restored by this method has lower noise and clearer details to human eyes than an image obtained by equivalent processing on the RGB colors. In application requiring high-definition images, images obtained based on a Bayer filter, that is, Bayer images, may be selected. The Bayer images may be classified into four Bayer patterns, including BGGR, GBRG, GRBG, or RGGB.

For another example, in a vehicle-mounted front-view application, the foregoing CFA may employ a red-monochrome (e.g., RCCC) configuration. In this configuration, a filter structure of the CFA includes three Clear-C filters and one red light filter. Compared with the Bayer filter which discards ⅔ of a light source during processing, an RCCC CFA has higher signal sensitivity and can sufficiently determine conditions of a headlight (e.g., white) and a taillight (e.g., red) of an automobile and other conditions based on intensity of red light. Based on this, RCCC images are suitable for low-light environments, and are mainly applied to situations sensitive to red signs, such as traffic light detection, automobile headlight detection, and automobile taillight detection.

In consideration that an image usually needs to enable a good color resolution capability during machine analysis on the image, the foregoing CFA configuration may be 50% transparent transmission, and red light and blue light each account for 25%. An image obtained on this basis is an RCCB image. In other words, the first image may alternatively be an RCCB image.

In some scenarios with a requirement on color object recognition, for example, during driver status detection, the first image may alternatively be monochrome. The first image is 100% transparently transmitted, and does not support color resolution. However, this configuration has highest low-light sensitivity, and therefore has a relatively good detection effect.

For a vehicle having an autonomous driving function or an assisted driving function, when the foregoing function is enabled, the autonomous driving system or driver assistant system may invoke a camera to photograph a first image. The server obtains the first image from the autonomous driving system or driver assistant system, so as to implement obstacle detection by using an image processing technology subsequently.

It should be noted that, for obtaining of the first image, the server may periodically and automatically obtain the first image, or may obtain the first image in response to an obstacle detection request message when the server receives the request message.

S202. Reconstruct the first image to obtain a second image, where the second image is a hyper spectral image.

The so-called hyper spectral image refers to a group of spectral images whose spectral resolution falls within a range at an order of magnitude of 10I (that is, 10-2λ). It generally contains tens to hundreds of spectral bands. In some embodiments, in this embodiment, the server may reconstruct, based on a correspondence between a spatial feature and a hyper spectral feature, the first image photographed by a common camera, to obtain the second image, so that the hyper spectral image can be obtained without using an imaging spectrometer, and no additional hardware cost is required.

In some embodiments, the server may first extract a spatial feature of the first image by using an image processing technology, for example, by using a convolutional neural network, and then perform image reconstruction based on the spatial feature of the first image by using a correspondence between the spatial feature and a spectral feature to obtain the second image.

Figure 3:
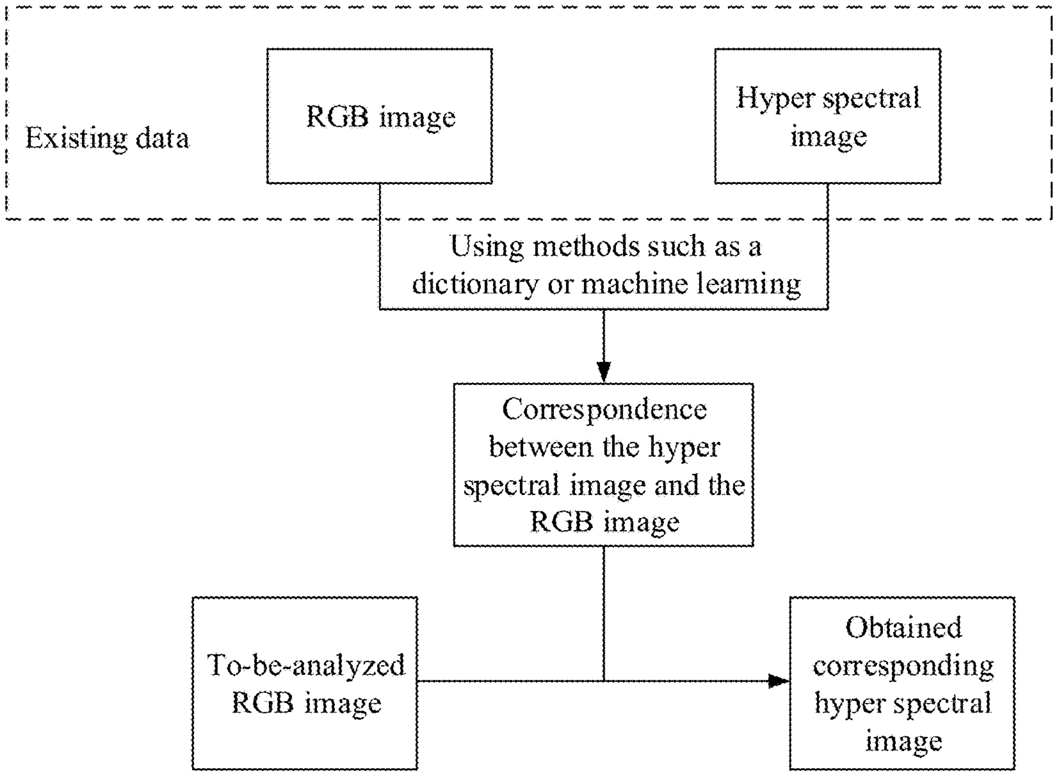
FIG. 3 is a flowchart of an obstacle detection method according to an embodiment of this application.

The correspondence between a spatial feature and a spectral feature may be obtained in a plurality of manners. Referring to FIG. 3, in a first manner, the server may generate a data dictionary based on RGB images and hyper spectral images in existing data. The data dictionary includes the correspondence between a spatial feature and a spectral feature, and the server writes the data dictionary into a configuration file. In this way, when performing image reconstruction, the server may obtain the data dictionary from the configuration file, and then reconstruct a to-be-analyzed RGB image (that is, the first image) based on the correspondence between a spatial feature and a spectral feature included in the data dictionary, to obtain a hyper spectral image (that is, the second image).

The following describes in detail a process of obtaining the data dictionary.

It can be known from material composition in an image scene that, although a hyper spectral image is composed of two-dimensional images at tens or hundreds of bands, because materials in the image scene do not change dramatically, a scene of each hyper spectral image contains no more than 12 materials. These characteristics of a hyper spectral image determine that the hyper spectral image may be sparsely represented by using an appropriate dictionary.

Figure 4:
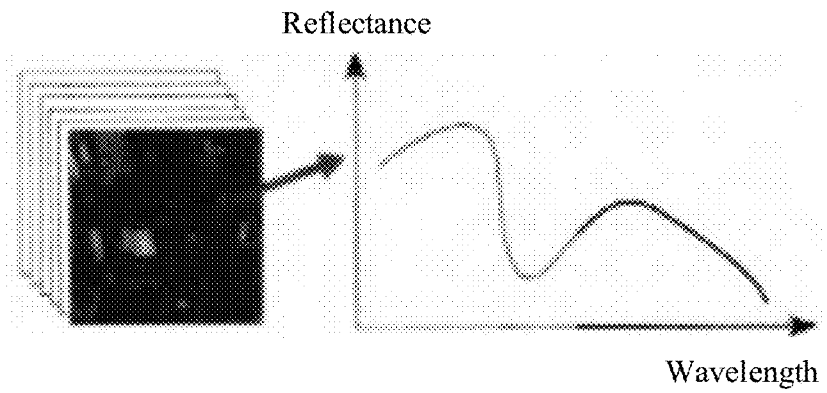
FIG. 4 is a schematic diagram of a spectral curve extracted from a hyper spectral image according to an embodiment of this application.

It can be understood that, different materials in a scene of a hyper spectral image have specific spectral reflectance curves. A curve trend of a material is fixed although a value of a reflectance of the material varies with illumination, a photographing angle, an object geometric structure, non-uniformity of the material, and moisture content. Based on this, as shown in FIG. 4, a spectral curve of a spectrum may be extracted for each pixel in space of the hyper spectral image. These spectral curves are obtained by linearly superimposing spectral curves of one or more materials. If the spectral reflectance curves of the materials included in the scene of the hyper spectral image are used as dictionary atoms, all pixels on the hyper spectral image may be sparsely represented by using the dictionary.

In some embodiments, a hyper spectral image has spatial correlation similar to that of a gray image in a spatial direction, that is, pixels in adjacent spatial locations have similar material composition and structures. Therefore, each spectral band may be considered as an independent two-dimensional image. If the two-dimensional image is divided into overlapping blocks to learn a spatial dictionary, the blocks may be sparsely represented by using the obtained dictionary.

By dividing a hyper spectral image into three-dimensional overlapping blocks, spatial correlation of the image is considered and inter-spectral correlation of the image is applied. Therefore, the learned dictionary better matches structural characteristics of the hyper spectral image.

In a second implementation, alternatively, the server may obtain sample data, and perform machine learning by using the sample data to obtain the correspondence between a spatial feature and a spectral feature. The server may obtain the correspondence between a spatial feature and a spectral feature by using a conventional machine learning algorithm such as random forest, or may obtain the correspondence between a spatial feature and a spectral feature by using deep learning.

An example in which the foregoing correspondence is obtained based on deep learning is used for description.

In an example, referring to FIG. 3, the server performs feature extraction based on the RGB images and the hyper spectral images in the existing data to generate sample data. The sample data includes spatial features extracted from the RGB images and spectral features extracted from the hyper spectral images. The server initializes a convolutional neural network model. The convolutional neural network model uses a spatial feature as input and a spectral feature as output. Then, the server inputs the sample data into the convolutional neural network model. The convolutional neural network model can predict spectral features corresponding to the spatial features. Then, the server calculates a loss function based on the spectral features obtained by prediction and the spectral features included in the sample data, and updates model parameters of the convolutional neural network model based on the loss function.

Through continuous update by using a large quantity of samples, when the loss function of the convolutional neural network model tends to converge, or when the loss function of the convolutional neural network model is less than a preset value, iterative training may be stopped. In this case, the convolutional neural network model may be used to extract the correspondence between a spatial feature and a spectral feature. Based on this, after the spatial feature of the first image is extracted, the spatial feature is input into the convolutional neural network model to obtain a corresponding spectral feature, and reconstruction may be performed based on the spectral feature to obtain the hyper spectral image.

S203. Extract a hyper spectral feature from the hyper spectral image, and classify a candidate object in the hyper spectral image based on the hyper spectral feature to obtain an obstacle detection result.

In actual application, the server may first determine the candidate object based on to the hyper spectral image, for example, may identify the candidate object in a manner of a candidate box, and then classify the candidate object based on the hyper spectral feature extracted from the hyper spectral image, so as to obtain the obstacle detection result.

Because different textures correspond to different hyper spectral features, classifying candidate objects with a same color or similar colors but different textures based on the hyper spectral features achieves relatively high accuracy. On this basis, a detection rate of obstacle detection is relatively high, and a safety hazard caused by missed detection of an obstacle that has a same or similar color can be avoided.

Further, alternatively, the server may classify the candidate object based on the hyper spectral feature in combination with the spatial feature, so as to further improve classification accuracy. In some embodiments, the server may fuse the hyper spectral feature and the spatial feature of the first image to obtain a fused feature, and then classify the candidate object in the hyper spectral image based on the fused feature.

The server may implement feature fusion by using a fusion algorithm. In an example of this application, the server may fuse the hyper spectral feature and the spatial feature of the first image by using a Bayesian data fusion algorithm. It should be noted that, the Bayesian data fusion algorithm is merely a specific example in this application. In actual application, the server may also use another fusion algorithm to fuse the hyper spectral feature and the spatial feature.

It can be understood that, when determining, based on the hyper spectral feature, that a candidate object is an obstacle, the server may output a location and a texture of the obstacle together as an obstacle detection result. It should be noted that, this application protects a texture feature-based obstacle detection method. Therefore, an interface for describing the information also falls within the protection scope of this application. Based on this, an improvement may be made to a corresponding interface in a related standard.

For example, for an object interface detected in ISO 23150, referring to Table 1, an object texture field may be added to describe a texture of a detected obstacle.

TABLE 1

| Object interface description (partial) | | | |
|---|---|---|---|
| Object status | M | Object ID | M |
| | | Age | M |
| | | Measurement status | M |
| | | Object texture | O |

In some embodiments, the obstacle detection result may include a grain of the obstacle. In this way, the server may classify the candidate object based on at least one of a texture feature and a grain feature.

In a scenario such as autonomous driving or assisted driving, when the obstacle detection result includes a location and a texture of an obstacle, the server may determine a drivable area based on the location and the texture of the obstacle, and then the server sends the drivable area to a controller of a vehicle to indicate the vehicle to travel based on the drivable area. Certainly, the server may alert a user based on the location and the texture of the obstacle, to remind the driver that the obstacle exists or no obstacle exists on a driving path.

It can be learned from the foregoing description that, the embodiments of this application provide the obstacle detection method. In the method, the first image encoded based on the RGB model is reconstructed to obtain the hyper spectral image, and the hyper spectral feature is extracted from the hyper spectral image. Because different textures correspond to different hyper spectral features, classifying candidate objects in hyper spectral images based on the hyper spectral features can distinguish an object that has a similar color but a different texture. On this basis, an obstacle that has a color same as or similar to that of an environment can be detected, thereby reducing a detection miss rate. In some embodiments, in the method, a common camera may be used to obtain hyper spectral images in a manner of image reconstruction, without using an imaging spectrometer. Therefore, a cost is low and feasibility is high.

To make the technical solutions of this application clearer and easier to understand, the following describes the obstacle detection method from a perspective of module interaction.

Figure 5:
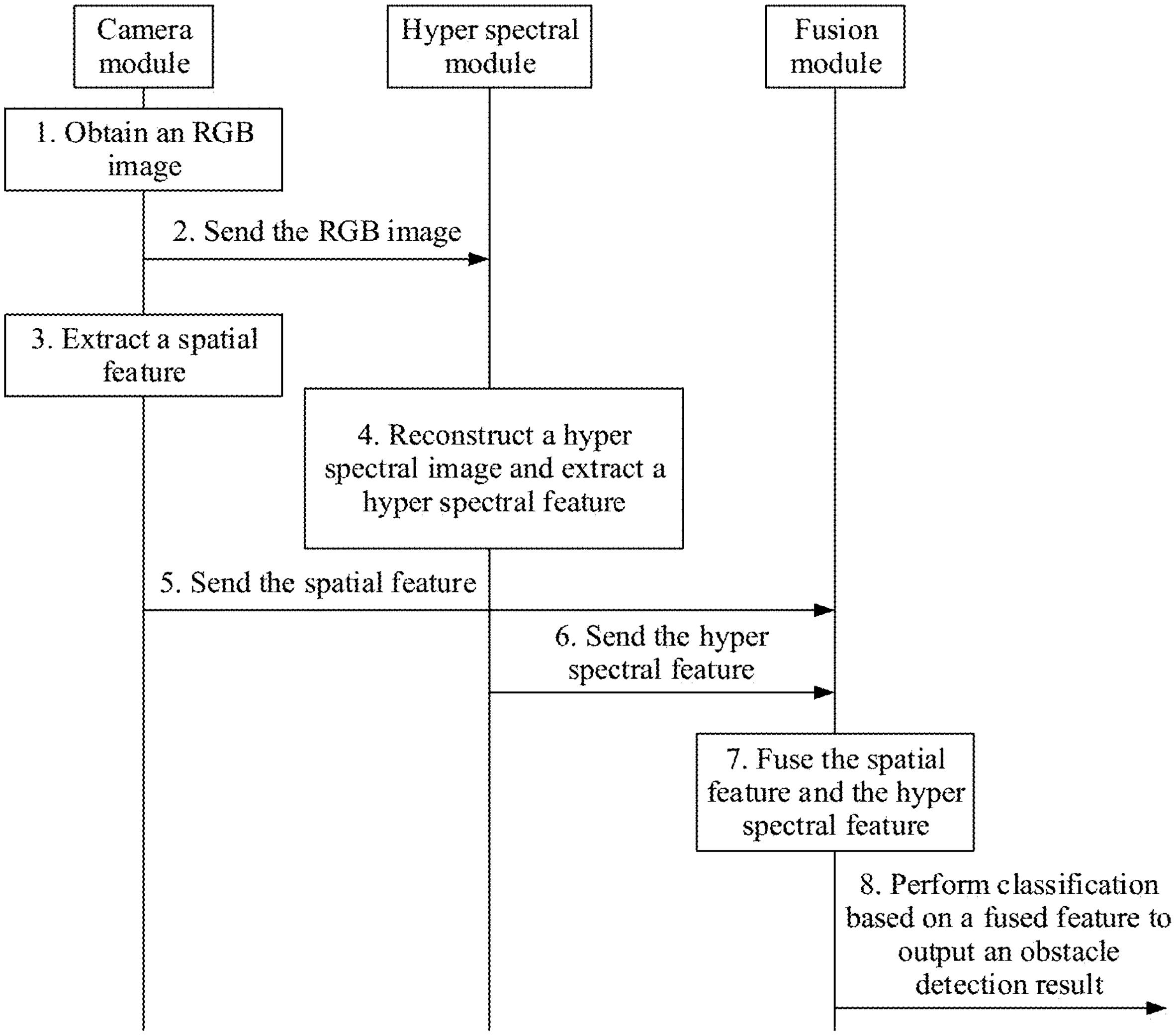
FIG. 5 is a flowchart of interaction in an obstacle detection method according to an embodiment of this application.

Referring to a flowchart of an obstacle detection method shown in FIG. 5, the method includes the following operations.

1. A camera module obtains an RGB image.

A camera in the camera module may be a common camera, so as to reduce a hardware cost.

2. The camera module sends the RGB image to a hyper spectral module.
3. The camera module extracts a spatial feature from the RGB image.

The spatial feature may be specifically free space information in the RGB image.

4. The hyper spectral module reconstructs the RGB image to obtain a hyper spectral image, and extracts a hyper spectral feature from the hyper spectral image.
5. The camera module sends the spatial feature to a fusion module.
6. The hyper spectral module sends the hyper spectral feature to the fusion module.

Operations 2, 3, 5, and 6 may be performed in a random order, for example, may be performed simultaneously or in a specified order.

7. The fusion module fuses the spatial feature and the hyper spectral feature to obtain a fused feature.

In an example, the fusion module may perform fusion based on a bounding box of the object in each of the two images, namely, the RGB image and the hyper spectral image. The fusion module uses the bounding box of the object in the RGB image and the bounding box of the object in the hyper spectral module as input, and fuses the bounding boxes of the object in combination with attributes such as a location and a speed of the object, so as to fuse the spatial feature of the RGB image and the hyper spectral feature of the hyper spectral image.

A typical fusion algorithm may a Bayesian data fusion algorithm. For an object that is not detected in an RGB image due to an indistinctive color feature but is detected in a hyper spectrum, fusion relies on an object detection result of the hyper spectrum. In this way, comprehensive object detection can be implemented, and missed detection of an obstacle can be reduced.

8. The fusion module classifies the candidate object in the image by using the fused feature to output an obstacle detection result.

The obstacle detection result includes a location and a texture of the obstacle.

It should be noted that, the foregoing hyper spectral module is a logical module, and may be deployed with the camera module in a unified manner or may be separately deployed during physical deployment.

Figure 6:
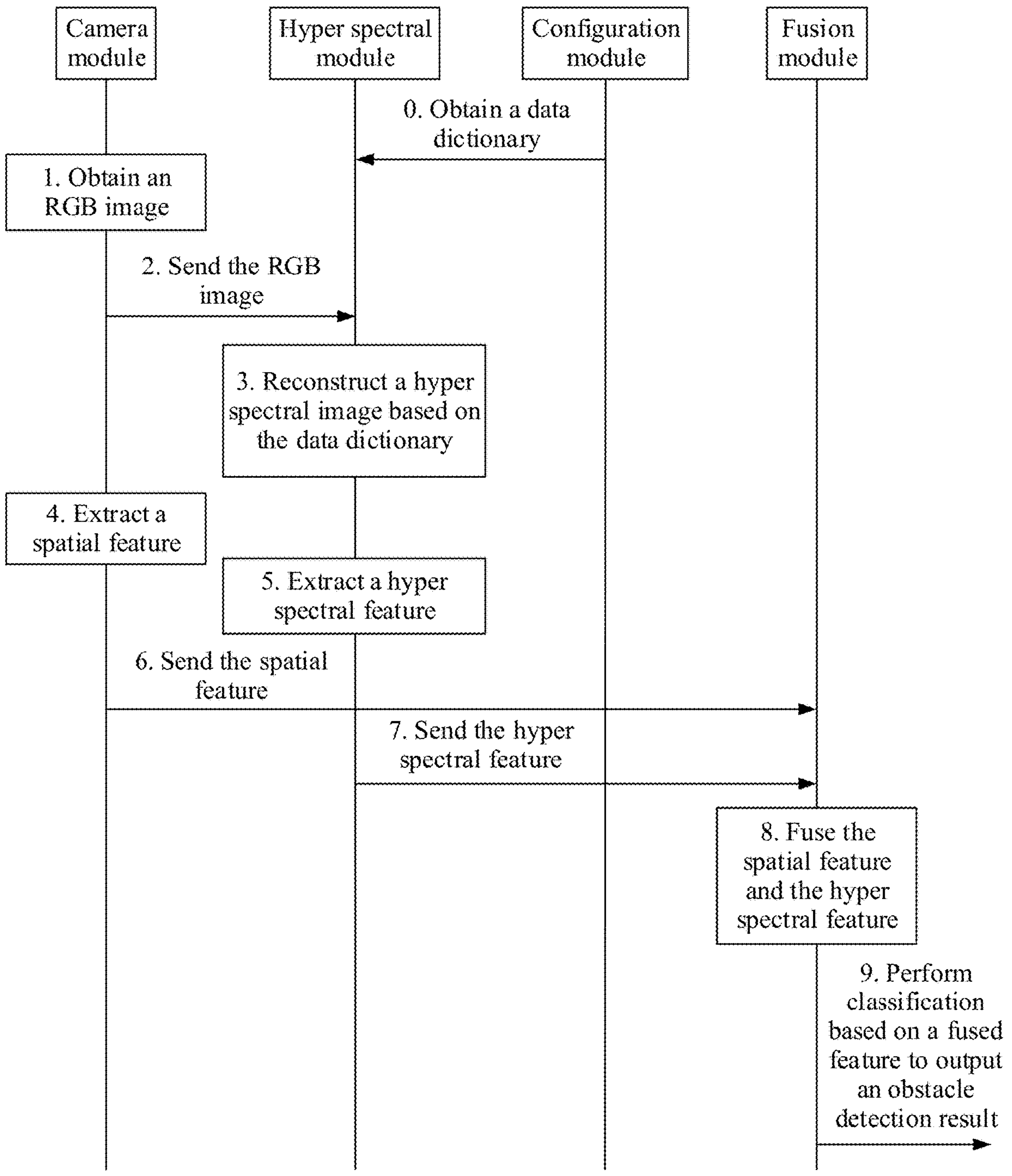
FIG. 6 is a flowchart of interaction in an obstacle detection method according to an embodiment of this application.

In some embodiments, the hyper spectral module may perform image reconstruction based on a data dictionary in a configuration module, and/or implement obstacle detection based on the hyper spectral image obtained by reconstruction. Referring to a flowchart of an obstacle detection method shown in FIG. 6, the method includes the following operations.

0. A hyper spectral module obtains, from a configuration module, a data dictionary applicable to reconstruction of the hyper spectral module in advance.

The data dictionary includes a correspondence between a spatial feature and a spectral feature. Therefore, an RGB image may be converted into a hyper spectral image based on the data dictionary, for application to subsequent obstacle detection.

1. A camera module obtains an RGB image.
2. The camera module sends the RGB image to the hyper spectral module.

3. The hyper spectral module reconstructs the RGB image based on the data dictionary to obtain a hyper spectral image.
4. The camera module extracts a spatial feature from the RGB image.
5. The hyper spectral module extracts a hyper spectral feature from the hyper spectral image.
6. The camera module sends the spatial feature to a fusion module.
7. The hyper spectral module sends the hyper spectral feature to the fusion module.
8. The fusion module fuses the spatial feature and the hyper spectral feature by using a fusion algorithm.
9. The fusion module classifies a candidate object based on the fused feature to obtain an obstacle detection result.

For specific implementation of the related operations in this embodiment, refer to the related content description above. Details are not described herein again. It should be noted that, in this embodiment, an execution order of operations 0 to 7 may be set based on an actual need. For example, operations 0 and 1 may be performed in parallel, and operations 6 and 7 may also be performed in parallel. Certainly, the foregoing operations may also be performed in a specified order.

The foregoing provides specific implementations of the obstacle detection method provided in the embodiments of this application. Based on this, this application further provides a corresponding apparatus. The following describes the apparatus from a perspective of functional modularity.

Figure 7:
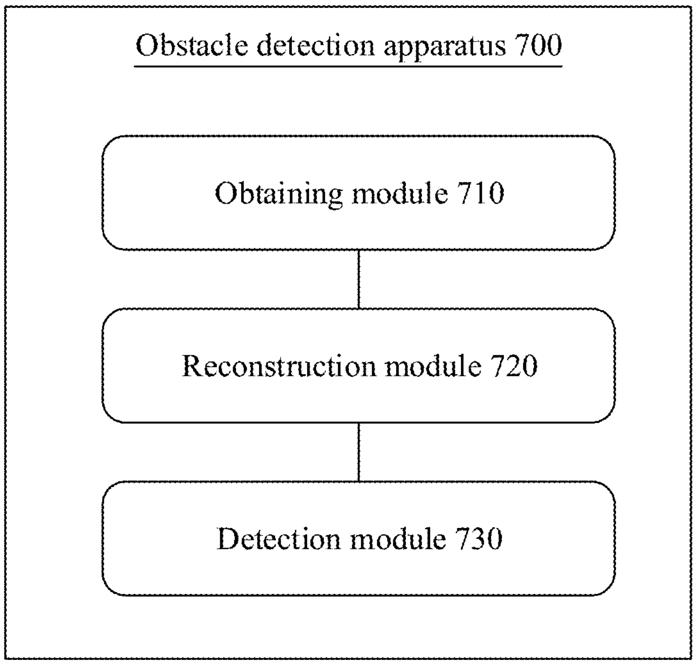
FIG. 7 is a schematic diagram of a structure of an obstacle detection apparatus according to an embodiment of this application.

FIG. 7 is a schematic diagram of a structure of an obstacle detection apparatus. The apparatus 700 includes:

an obtaining module 710, configured to obtain a first image, where the first image is an image encoded based on an RGB model;

a reconstruction module 720, configured to reconstruct the first image to obtain a second image, where the second image is a hyper spectral image; and a detection module 730, configured to: extract a hyper spectral feature from the hyper spectral image, and classify a candidate object in the hyper spectral image based on the hyper spectral feature to obtain an obstacle detection result.

In some embodiments, the reconstruction module 720 is specifically configured to:

extract a spatial feature of the first image; and perform image reconstruction based on the spatial feature of the first image by using a correspondence between the spatial feature and a spectral feature to obtain the second image.

In some embodiments, the obtaining module 710 is configured to:

obtain a data dictionary from a configuration file, where the data dictionary includes a correspondence between a spatial feature and a spectral feature; or obtain sample data, and perform machine learning by using the sample data to obtain a correspondence between a spatial feature and a spectral feature.

In some embodiments, the apparatus 700 includes:

a fusion module, configured to fuse the hyper spectral feature and the spatial feature of the first image to obtain a fused feature; and the detection module 730 is specifically configured to:

classify the candidate object in the hyper spectral image based on the fused feature.

In some embodiments, the fusion module is specifically configured to:

fuse the hyper spectral feature and the spatial feature of the first image by using a Bayesian data fusion algorithm.

In some embodiments, the first image includes an RGB image, an RCCC image, an RCCB image, or an RGGB image.

In some embodiments, the obstacle detection result includes a location and a texture of the obstacle; and the apparatus includes:

a determining module, configured to determine a drivable area based on the location and the texture of the obstacle; and a sending module, configured to send the drivable area to a controller of a vehicle to indicate the vehicle to travel based on the drivable area.

An embodiment of this application further provides a device, configured to implement obstacle detection. The device may be specifically a server. The server 800 may vary greatly with a configuration or performance, and may include one or more central processing units (CPUs) 822 (for example, one or more processors), a memory 832, and one or more storage media 830 (for example, one or more mass storage devices) for storing an application program 842 or data 844. The memory 832 and the storage medium 830 may implement temporary or persistent storage. Programs stored in the storage media 830 may include one or more modules (not shown in the figure), and each module may include a series of instruction operations on the server. Further, the central processing unit 822 may be configured to communicate with the storage medium 830 to perform, on the server 800, a series of instruction operations in the storage medium 830.

The server 800 may include one or more power supplies 826, one or more wired or wireless network interfaces 850, one or more input/output interfaces 858, and/or one or more operating systems 841, such as Windows Server™, Mac OS X™, Unix™, Linux™, or FreeBSD™.

Figure 8:
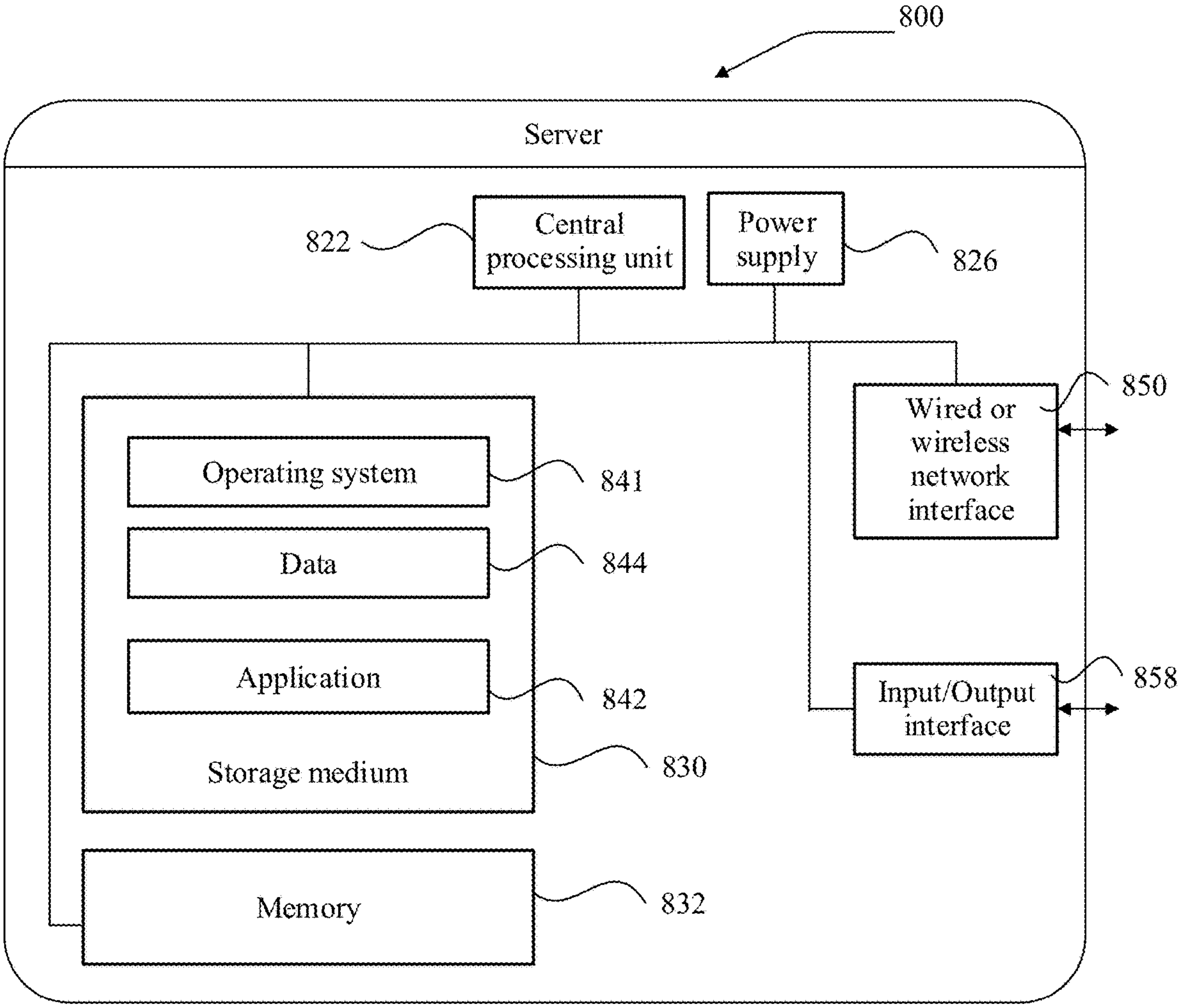
FIG. 8 is a schematic diagram of a structure of a server according to an embodiment of this application.

Operations performed by the server in the foregoing embodiments may be based on the server structure shown in FIG. 8.

The CPU 822 is configured to perform the following operations:

obtaining a first image, where the first image is an image encoded based on an RGB model;

reconstructing the first image to obtain a second image, where the second image is a hyper spectral image; and extracting a hyper spectral feature from the hyper spectral image, and classifying a candidate object in the hyper spectral image based on the hyper spectral feature to obtain an obstacle detection result.

In some embodiments, the CPU 822 is configured to perform operations in any implementation of the obstacle detection method provided in the embodiments of this application.

It can be understood that, the foregoing server cooperates with a driver assistant system or an autonomous driving system in a vehicle to implement obstacle detection. In some embodiments, the foregoing obstacle detection method may alternatively be independently implemented by a driver assistant system or an autonomous driving system. The following uses the driver assistant system as an example for description.

An embodiment of this application further provides a driver assistant system, including a processor and a memory.

The memory is configured to store a computer program.

The processor is configured to perform the following operations based on instructions in the computer program:

obtaining a first image, where the first image is an image encoded based on an RGB model;

reconstructing the first image to obtain a second image, where the second image is a hyper spectral image; and extracting a hyper spectral feature from the hyper spectral image, and classifying a candidate object in the hyper spectral image based on the hyper spectral feature to obtain an obstacle detection result.

In some embodiments, the processor is configured to perform operations in any implementation of the obstacle detection method provided in the embodiments of this application.

An embodiment of this application further provides a computer-readable storage medium. The computer-readable storage medium is configured to store program code, and the program code is used to perform the obstacle detection method according to this application.

An embodiment of this application further provides a computer program product including computer-readable instructions. When the computer-readable instructions are run on a computer, the computer is enabled to perform the obstacle detection method in the foregoing aspects.

It may be clearly understood by persons skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed apparatuses and methods may be implemented in other manners. For example, the described apparatus embodiments are merely examples. For example, division into the modules is merely logical function division and may be other division during actual implementation. For example, a plurality of units or components may be combined or integrated into another system, or some features may be ignored or not performed. In some embodiments, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (e.g., pieces)" or a similar expression thereof indicates any combination of these items, including any combination of singular items (e.g., pieces) or plural items (e.g., pieces). For example, at least one (e.g., piece) of a, b, or c may indicate: a, b, c, "a and b", "a and c", "b and c", or "a, b, and c", where a, b, and c may be singular or plural.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions recorded in the foregoing embodiments or make equivalent replacements to some technical features thereof without departing from the scope of the technical solutions of the embodiments of this application.

What is claimed is:

1. An obstacle detection method, wherein the method comprises:

obtaining a first image, wherein the first image is an image encoded based on an RGB model;

reconstructing the first image to obtain a second image that is a hyper spectral image, wherein the reconstructing the first image to obtain the hyper spectral image comprises:

extracting a spatial feature of the first image;

obtaining a spectral feature corresponding to the spatial feature, wherein the obtaining spectral feature corresponding to the spatial feature comprises:

inputting the spatial feature to a convolutional neural network; and obtaining, as an output from the convolutional neural network, the spectral feature corresponding to the spatial feature, wherein the convolutional neural network is trained to establish a correspondence between spatial features and spectral features; and using the spectral feature during the reconstructing to obtain the hyper spectral image;

after reconstructing the first image to obtain the hyper spectral image, extracting a hyper spectral feature from the hyper spectral image;

fusing the hyper spectral feature and the spatial feature of the first image to obtain a fused feature; and classifying a candidate object in the hyper spectral image based on the fused feature to obtain an obstacle detection result.

2. The method according to claim 1, wherein the hyper spectral feature and the spatial feature of the first image are fused by using a Bayesian data fusion algorithm.

3. The method according to claim 1, wherein the first image comprises an RGB image, an RCCC image, an RCCB image, or an RGGB image.

4. The method according to claim 1, wherein the obstacle detection result comprises a location and a texture of the candidate object; and the method further comprises:

determining a drivable area based on the location and the texture of the candidate object; and sending the drivable area to a controller of a vehicle to indicate the vehicle to travel based on the drivable area.

5. An obstacle detection apparatus, comprising:

one or more processors, and a non-transitory storage medium in communication with the one or more processors, the non-transitory storage medium configured to store program instructions, wherein, when executed by the one or more processors, the instructions cause the apparatus to:

obtain a first image;

reconstruct the first image to obtain a second image, wherein the second image is a hyper spectral image, wherein the apparatus is further to:

extract a spatial feature of the first image;

obtain a spectral feature corresponding to the spatial feature, wherein the obtaining spectral feature corresponding to the spatial feature comprises:

input the spatial feature to a convolutional neural network; and obtain, as an output from the convolutional neural network, the spectral feature corresponding to the spatial feature, wherein the convolutional neural network is trained to establish a correspondence between spatial features and spectral features;

and use the spectral feature during the reconstructing to obtain the hyper spectral image;

after reconstruction of the first image to obtain the hyper spectral image, extract a hyper spectral feature from the hyper spectral image;

fuse the hyper spectral feature and the spatial feature of the first image to obtain a fused feature; and classify a candidate object in the hyper spectral image based on the fused feature to obtain an obstacle detection result.

6. The obstacle detection apparatus according to claim 5, wherein the hyper spectral feature and the spatial feature of the first image are fused by using a Bayesian data fusion algorithm.

7. The obstacle detection apparatus according to claim 5, wherein the first image comprises an RGB image, an RCCC image, an RCCB image, or an RGGB image.

8. The obstacle detection apparatus according to claim 5, wherein the first image is an image encoded based on an RGB model.

9. A non-transitory computer-readable storage medium, wherein the computer-readable storage medium is configured to store a computer program, and the computer program is configured to:

obtain a first image;

reconstruct the first image to obtain a second image, wherein the second image is a hyper spectral image, wherein the computer program is further configured to:

extract a spatial feature of the first image;

obtain a spectral feature corresponding to the spatial feature, wherein the obtaining spectral feature corresponding to the spatial feature comprises:

input the spatial feature to a convolutional neural network; and obtain, as an output from the convolutional neural network, the spectral feature corresponding to the spatial feature, wherein the convolutional neural network is trained to establish a correspondence between spatial features and spectral features;

and use the spectral feature during the reconstructing to obtain the hyper spectral image;

after reconstruction of the first image to obtain the hyper spectral image, extract a hyper spectral feature from the hyper spectral image;

fuse the hyper spectral feature and the spatial feature of the first image to obtain a fused feature; and classify a candidate object in the hyper spectral image based on the fused feature to obtain an obstacle detection result.

10. The computer-readable storage medium according to claim 9, wherein the first image is an image encoded based on an RGB model.

* * * * *